US010481807B2

(12) United States Patent
Benedict et al.

(10) Patent No.: US 10,481,807 B2
(45) Date of Patent: Nov. 19, 2019

(54) STATUS FOR GENERATED DATA IMAGE

(71) Applicant: HEWLETT PACKARD ENTERPRISE DEVELOPMENT LP, Houston, TX (US)

(72) Inventors: Melvin K. Benedict, Houston, TX (US); Lidia Warnes, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 15/535,828

(22) PCT Filed: Dec. 22, 2014

(86) PCT No.: PCT/US2014/071922
§ 371 (c)(1),
(2) Date: Jun. 14, 2017

(87) PCT Pub. No.: WO2016/105345
PCT Pub. Date: Jun. 30, 2016

(65) Prior Publication Data
US 2017/0351455 A1 Dec. 7, 2017

(51) Int. Cl.
*G06F 11/00* (2006.01)
*G06F 3/06* (2006.01)
(Continued)

(52) U.S. Cl.
CPC ............ *G06F 3/0619* (2013.01); *G06F 1/30* (2013.01); *G06F 11/1441* (2013.01);
(Continued)

(58) Field of Classification Search
CPC ............. G06F 11/1441; G06F 11/1451; G06F 11/1469; G06F 11/3058; G06F 11/1446; G06F 1/30; G06F 1/305; G06F 3/0619; G06F 3/0632; G06F 3/0647; G06F 3/0688; G06F 2201/84
See application file for complete search history.

(56) References Cited

U.S. PATENT DOCUMENTS 5,386,552 A    1/1995  Garney
7,392,429 B2 * 6/2008  Frank ................. G06F 1/30
                                              714/22

(Continued)

FOREIGN PATENT DOCUMENTS

EP    1351146 A1    10/2003

OTHER PUBLICATIONS

Narayanana, D. et al., "Whole-System Persistence," (Research Paper), Mar. 3-7, 2012, 10 Pages.
(Continued)

*Primary Examiner* — Marc Duncan
(74) *Attorney, Agent, or Firm* — Hewlett Packard Enterprise Patent Department

(57) ABSTRACT

Example implementations relate to generating statuses for data images. In example implementations, an event, in response to which a save operation is initiated on a memory module, may be identified. A data image may be generated during the save operation. A status may be generated for the generated data mage. The status may include an event portion indicative of the identified event, and a completion portion indicative of whether the save operation was completed.

12 Claims, 4 Drawing Sheets

(51) Int. Cl.
*G06F 1/30* (2006.01)
*G06F 11/14* (2006.01)
*G06F 11/30* (2006.01)

(52) U.S. Cl.
CPC ...... *G06F 11/1469* (2013.01); *G06F 11/3058* (2013.01); *G06F 2201/84* (2013.01); *G06F 2201/86* (2013.01)

(56) References Cited

U.S. PATENT DOCUMENTS

| | | | |
|---|---|---|---|
| 7,830,732 | B2 | 11/2010 | Moshayedi et al. |
| 8,767,463 | B2 | 7/2014 | Amidi et al. |
| 2010/0202239 | A1 | 8/2010 | Moshayedi et al. |
| 2012/0131253 | A1 | 5/2012 | McKnight et al. |
| 2013/0103887 | A1 | 4/2013 | Frey et al. |
| 2013/0166819 | A1 | 6/2013 | Yerushalmi et al. |
| 2014/0344563 | A1 | 11/2014 | Kim et al. |
| 2015/0089287 | A1* | 3/2015 | Jayakumar ............... G06F 1/30 714/23 |
| 2016/0239240 | A1* | 8/2016 | Wu ................. G06F 11/1666 |
| 2018/0329636 | A1* | 11/2018 | Dornemann ........ G06F 11/1435 |

OTHER PUBLICATIONS

Solid State Storage Initiative, "NVDIMM Messaging and FAQ," (Research Paper), Technical Brief, Jan. 2014, 10 Pages.
Smart Modular Technologies, "SMART Technical Brief: NVDIMM," (Research Paper), Jan. 7, 2014, 5 Pages.

\* cited by examiner

STATUS FOR GENERATED DATA IMAGE

BACKGROUND

Memory modules may include volatile memory and non-volatile memory. When a power failure, or an unexpected reset or reboot, is detected on a memory module, volatile memory on the memory module may be placed in self-refresh mode, and data in the volatile memory may be copied to non-volatile, memory on the memory module. When the memory module is rebooted, data may be recovered from the non-volatile memory.

BRIEF DESCRIPTION OF THE DRAWINGS

The following detailed description references the drawings, wherein.

DETAILED DESCRIPTION

When a memory module is properly shut down or reset, outstanding requests to store data on the memory module may be completed, and data in volatile memory and buffers on the memory module may be copied to non-volatile memory. In addition, a data image of memory (volatile or non-volatile, or both) on the memory module may be stored in non-volatile memory. As used herein, the term "data image" should be understood to refer to a computer file that contains a copy of the contents of a storage device. A data image may be, for example, a disk image, a boot image, or a system image. As used herein, the term "non-volatile memory", or "NVM", should be understood to refer to a memory capable of retaining stored instructions/data even when not powered. Examples of non-volatile memory include flash memory, memristor memory, and phase-change random-access memory (PCRAM). The process of generating a data image may be referred to herein as a "save operation".

Save operations may be initiated when memory modules are shut down or reset (expectedly or unexpectedly). Save operations may also be periodically initiated during runtime (e.g., by an operating system, or when buffers on a memory module are flushed). Thus, multiple data images of a given storage device may be generated and stored during operation of a memory module. Data coherency of data images may vary depending on the circumstances that led to the data images being generated. For example, data coherency of a data image generated in response to a flushing of buffers on a memory module may be higher than that of a data image generated when a power plane on the memory module failed. In addition, if an initiated save operation is interrupted, the data image generated during the save operation may be incomplete or have low data coherency.

When a memory module is reinitialized during a reboot (e.g., after a power failure or system hang/crash), a stored data image may be used to restore a previous state of the memory module (e.g., repopulate a volatile memory on the memory module with data that was present in the volatile memory before the power failure or system hang/crash occurred). If the most recently stored data image is incomplete or has low data coherency, an older data image (i.e., a data image generated/stored before the most recently stored data image) may be used to restore a state of the memory module. However, machine-readable instructions (e.g., firmware) that restore the memory module may not be able to identify under what circumstances the most recently stored data image was generated, and thus may use the most recently stored data image when an older data image may be more suitable for restoring a state of the memory module. In light of the above, the present disclosure provides for storing indications of circumstances under which data images are generated, facilitating selection of a suitable data image for system recovery.

Figure 1:
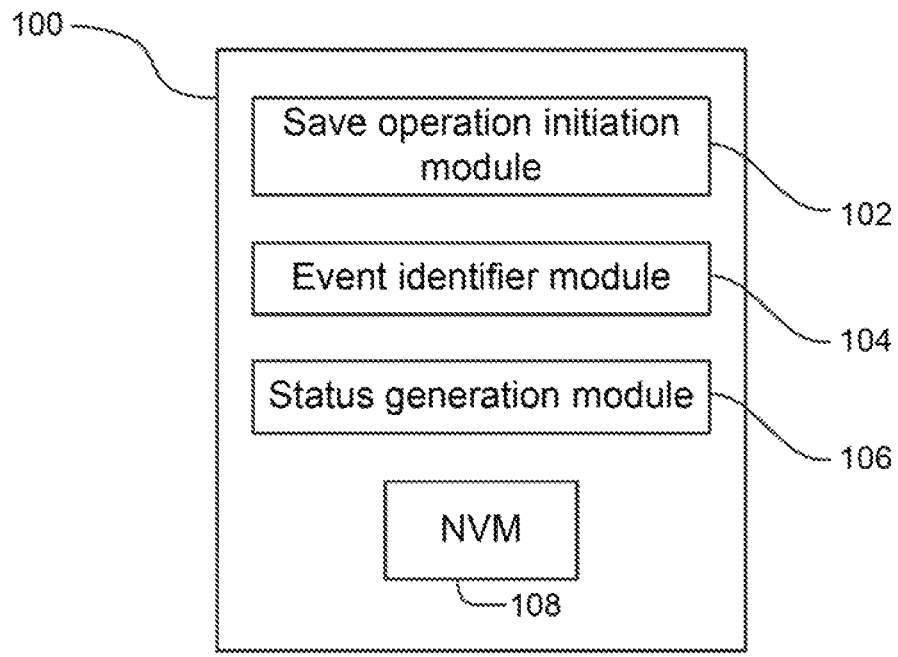
FIG. 1 is a block diagram of an example system for generating statuses for data images.

Referring now to the figures, FIG. 1 is a block diagram of an example system 100 for generating statuses for data images. System 100 may be implemented, for example, in an electronic user device (e.g., notebook computer, desktop computer, workstation, tablet computing device, mobile phone, or electronic book reader) or in a server. In FIG. 1, system 100 includes save operation initiation module 102, event identifier module 104, status generation module 106, and non-volatile memory (NVM) 108. As used herein, the terms "include", "have", and "comprise" are interchangeable and should be understood to have the same meaning. A module may include a set of instructions encoded on a machine-readable storage medium and executable by a processor. In addition or as an alternative, a module may include a hardware device comprising electronic circuitry for implementing the functionality described below.

Save operation initiation module 102 may initiate save operations on a memory module. The memory module may be, for example, a single in-line memory module (SIMM) or a dual in-line memory module (DIMM), or any memory module suitable for mounting memory integrated circuits (ICs). In some implementations, the memory module may be a non-volatile DIMM (NVDIMM). The memory module may be part of system 100, or may be communicatively coupled to system 100. A respective data image may be generated during each save operation.

Save operation initiation module 102 may initiate save operations in response to various events. For example, save operation initiation module 102 may initiate a save operation during normal shutdown or reset processes, or in response to a command by machine-readable instructions (e.g., software) on the memory module. In some implementations, save operation initiation module 102 may initiate a save operation whenever buffers on the memory module are flushed. In some implementations, save operation initiation module 102 may initiate, a save operation when a power plane or other component on the memory module fails.

Event identifier module 104 may identify a respective event in response to which each save operation is initiated. In some implementations, event identifier module 104 may monitor buffers, power planes, and/or other components on the memory module. If a change is detected in one of the monitored components (e.g., a buffer being flushed, a drop in power level) and a save operation is initiated shortly thereafter, event identifier module 104 may determine that the save operation was initiated in response to the detected change. In some implementations, event identifier module 104 may be notified when shutdown/reset processes are initiated, and may identify such processes as triggers for save operations.

Status generation module 106 may generate a respective status for each generated data image. Each status may include an event portion and a completion portion. Each event portion may be indicative of the respective event in response to which the respective save operation, during which the respective data image was generated, was initiated. For example, an event portion may indicate that the respective data image was initiated in response to a system shutdown command, or in response to a power plane failure on the memory module. Different events lead to different levels of data coherency in a data image, as discussed above. Each completion portion may be indicative of whether the respective save operation, during which the respective data image was generated, was completed. For example, if a save operation is interrupted, the completion portion of the status for the respective data image may indicate that the save operation was not completed.

In some implementations, each event portion may further be indicative of whether data in the respective data image is valid. For example, a write operation may have been in progress in a volatile memory on the memory module when a power plane on the memory module failed. A save operation may be initiated in response to the power plane failure, and a data image may be generated, but the data in the data image may be invalid or incoherent because the write operation was interrupted. The event portion of the status for such a data image may indicate that the data image is not valid. If no write operations were in progress when the save operation was initiated, the event portion of the status may indicate that the data in the data image is valid.

In some implementations, an event portion of a status may indicate whether buffers in the memory module were flushed before the respective data image was generated. For example, if the data image was generated during a save operation initiated in response to an unexpected reset of a memory module, the buffers in the memory module may not have been flushed before the save operation was initiated, and the event portion of the status for the data image may indicate that the buffers were not flushed before the data image was generated. In some implementations, whether the buffers were flushed may be determined based on the event indicated by the event portion.

Each respective generated status and data image may be stored in NVM 108. NVM 108 may include, for example, a flash memory or memristor memory. In some implementations, one byte may be used to store an event portion of a status, and one byte may be used to store a completion portion of the status. One of the data images stored in NVM 108 may be used to restore a state of the memory module when the memory module is rebooted, for example after a power or component failure. Statuses of stored data images may be used to determine which data image to use for the restoration process. For example, the most recently stored data image that has a status indicative of a completed save operation and an event that leads to a highly coherent data image may be selected for the restoration process.

Figure 2:
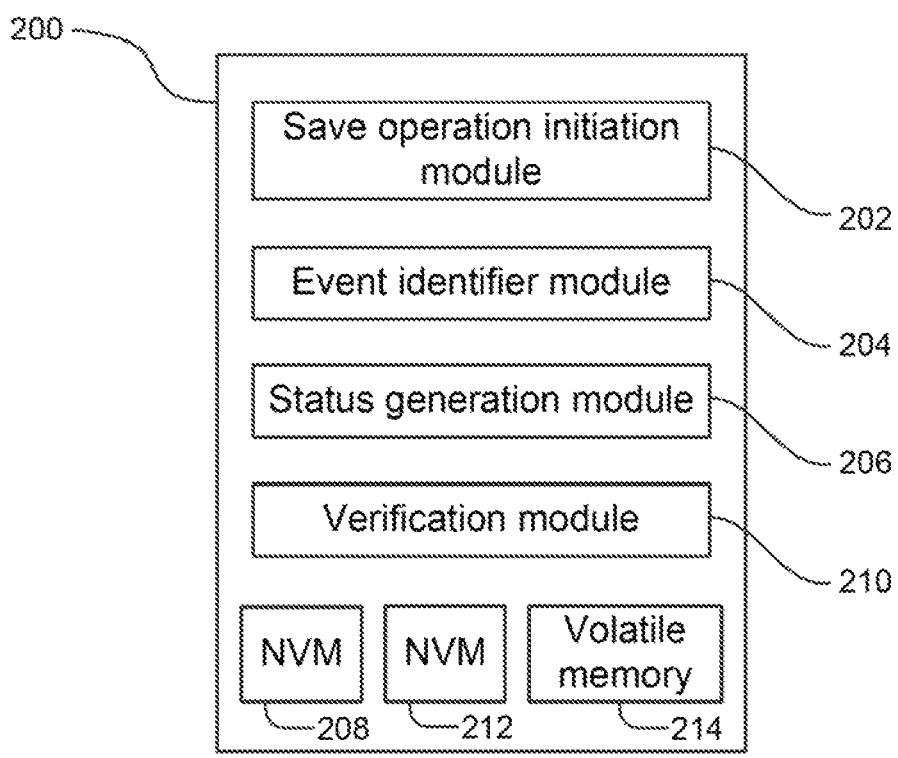
FIG. 2 is a block diagram of an example system for storing statuses for data images that are generated based on volatile or non-volatile memory.

FIG. 2 is a block diagram of an example system 200 for storing statuses for data images that are generated based on volatile or non-volatile memory. System 200 may be implemented, for example, in an electronic user device (e.g., notebook computer, desktop computer, workstation, tablet computing device, mobile phone, or electronic book reader) or in a server. In FIG. 2, system 200 includes save operation initiation module 202, event identifier module 204, status generation module 206, verification module 210, and NVM 208. Save operation initiation module 202 and event identifier module 204 of FIG. 2 may be analogous to (e.g., have functions and/or components similar to) save operation initiation module 102 and event identifier module 104, respectively, of FIG. 1. A module may include a set of instructions encoded on a machine-readable storage medium and executable by a processor. In addition or as an alternative, a module may include a hardware device comprising electronic circuitry for implementing the functionality described below.

Save operation initiation module 202 may initiate save operations on a memory module in response to various events (e.g., shutdown operation, flushing of buffers, power/component failure). Status generation module 208 may generate a respective status for each generated data image. Each status may include an event portion and a completion portion, as discussed above with respect to FIG. 1. Generated statuses and data images may be stored in NVM 208. In some implementations, a memory module in system 200 may include volatile memory 214, and data images may be generated based on volatile memory 214. In some implementations, a memory module in system 200 may include another NVM 212, and data images may be generated based on NVM 212. One of the data images stored in NVM 208 may be used to restore a state of a memory module when the memory module is rebooted (e.g., after a power/component failure), as discussed above with respect to FIG. 1.

In some implementations, status generation module 206 may embed a respective status for a generated data image in the data image. For example, the respective status for a generated data image may be embedded in a header of the data image, or embedded among copied data in the data image. In some implementations, the respective status for a generated data image may be stored in a first region of the NVM 208, and the generated data image may be stored in a second region of NVM 208. Each stored status may be stored with a pointer to the corresponding data image, or vice-versa.

Verification module 210 may verify self-consistency of each status. For example, verification module 210 may use a checksum to ensure that the appropriate status has been embedded in a data image. In some implementations, verification module 210 may verify stored statuses by comparing them with sequence numbers of transaction identifiers stored in data images.

Figure 3:
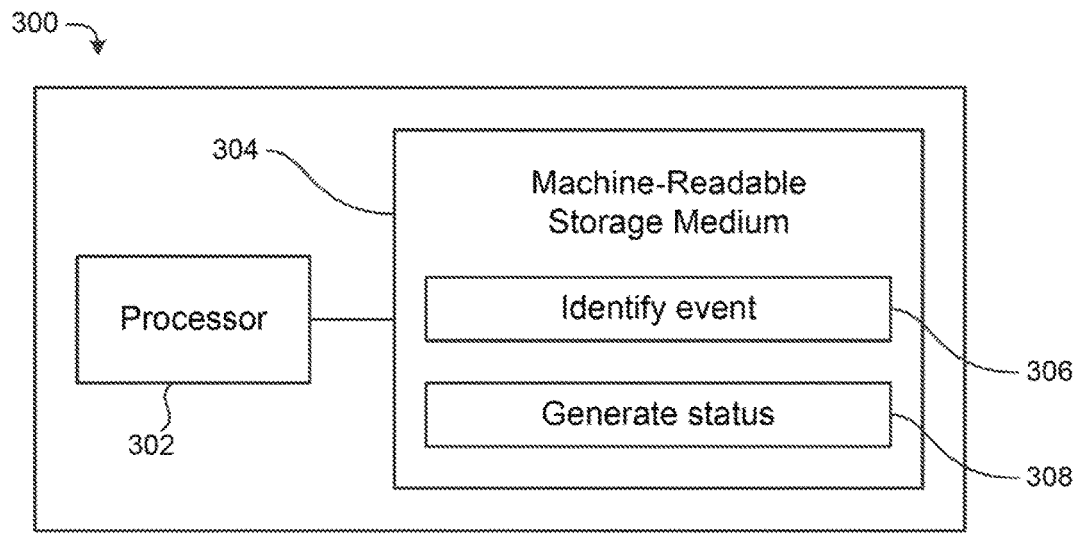
FIG. 3 is a block diagram of an example device that includes a machine-readable storage medium encoded with instructions to generate a status for a data image.

FIG. 3 is a block diagram of an example device 300 that includes a machine-readable storage medium encoded with instructions to generate a status for a data image. Device 300 may be implemented, for example, in an electronic user device (e.g., notebook computer, desktop computer, workstation, tablet computing device, mobile phone, or electronic book reader) or in a server. In FIG. 3, device 380 includes processor 302 and machine-readable storage medium 304.

Processor 302 may include a central processing unit (CPU), microprocessor (e.g., semiconductor-based microprocessor), and/or other hardware device suitable for retrieval and/or execution of instructions stored in machine-readable storage medium 304. Processor 302 may fetch, decode, and/or execute instructions 306 and 308. As an alternative or in addition to retrieving and/or executing instructions, processor 302 may include an electronic circuit comprising a number of electronic components for performing the functionality of instructions 306 and/or 308.

Machine-readable storage medium 304 may be any suitable electronic, magnetic, optical, or other physical storage device that contains or stores executable instructions. Thus, machine-readable storage medium 304 may include, for example, a random-access memory (RAM), an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306 and 308.

Instructions 306 may identify an event in response to which a save operation is initiated on a memory module. In some implementations, instructions 306 may identify an event by monitoring buffers, power planes, and/or other components on the memory module, as discussed above with respect to FIG. 1. The memory module (e.g., a SIMM or DIMM) may be part of device 300, or may be communicatively coupled to device 300. In some implementations, the memory module may be an NVDIMM. A data image may be generated during the save operation.

Instructions 308 may generate a status for the generated data image. The status may include an event portion indicative of the identified event, and a completion portion indicative of whether the save operation was completed. In some implementations, the event portion may further be indicative of whether data in the data image is valid, as discussed above with respect to FIG. 1.

Figure 4:
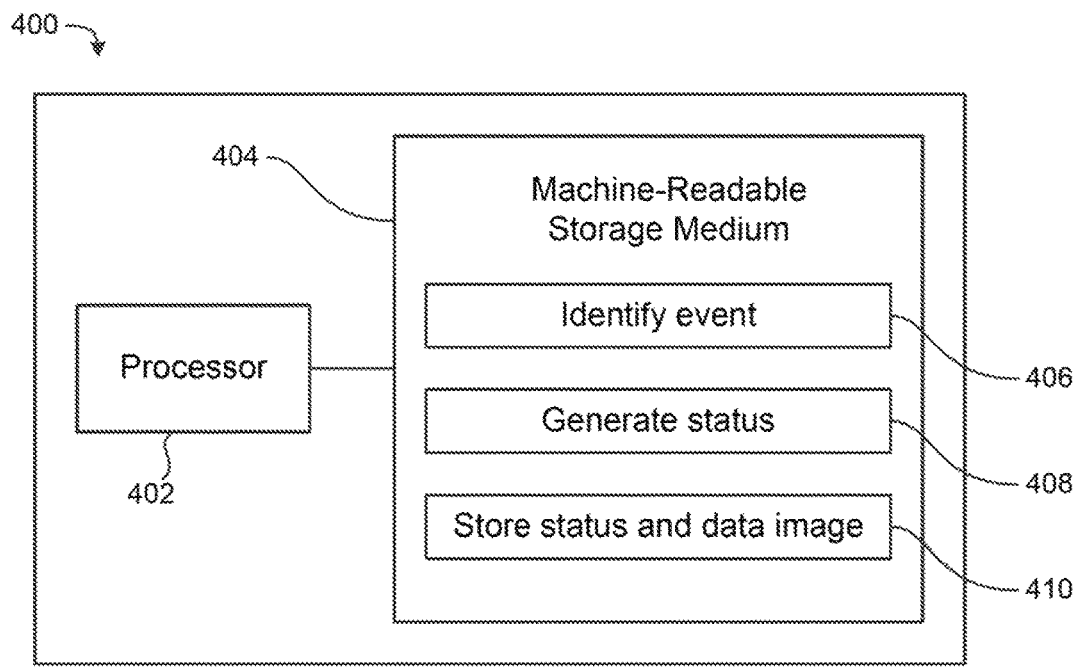
FIG. 4 is a block diagram of an example device that includes a machine-readable storage medium encoded with instructions to store a generated status and data image.

FIG. 4 is a block diagram of an example device 400 that includes a machine-readable storage medium encoded with instructions to store a generated status and data image. Device 400 may be implemented, for example, in an electronic user device (e.g., notebook computer, desktop computer, workstation, tablet computing device, mobile phone, or electronic book reader) or in a server. In FIG. 4, device 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, and 410. As an alternative or in, addition to retrieving and/or executing instructions, processor 402 may include an electronic circuit comprising a number of electronic components for performing the functionality of instructions 406, 408, and/or 410.

As with machine-readable storage medium 304 of FIG. 3, machine-readable storage medium 404 may be any suitable physical storage device that stores executable instructions. Instructions 406 and 408 on machine-readable storage medium 404 may be analogous to instructions 306 and 308, respectively, on machine-readable storage medium 304. Instructions 410 may store a generated status and its respective data image in a non-volatile memory. For example, instructions 410 may store a generated status and data image in NVM 108 of FIG. 1 or NVM 208 of FIG. 2. One of the data images stored in the non-volatile memory may be used to restore a state of a memory module when the memory module is rebooted (e.g., after a power/component failure), as discussed above with respect to FIG. 1.

In some implementations, a respective status for a generated data image may be embedded in the generated data image. For example, the respective status for a generated data image may be embedded in a header of the data image, or embedded among copied data in the data image. In some implementations, the status may be stored in a first region of the non-volatile memory, and the data image may be stored in a second region of the non-volatile memory. Each stored status may be stored with a pointer to the corresponding data image, or vice-versa.

Figure 5:
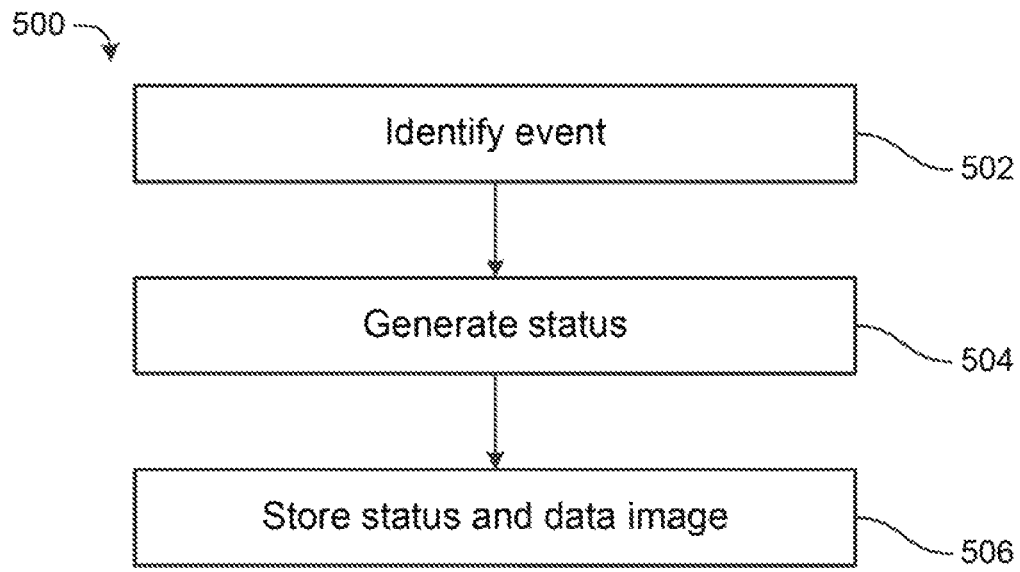
FIG. 5 is a flowchart of an example method for generating a status for a data image.
Figure 6:
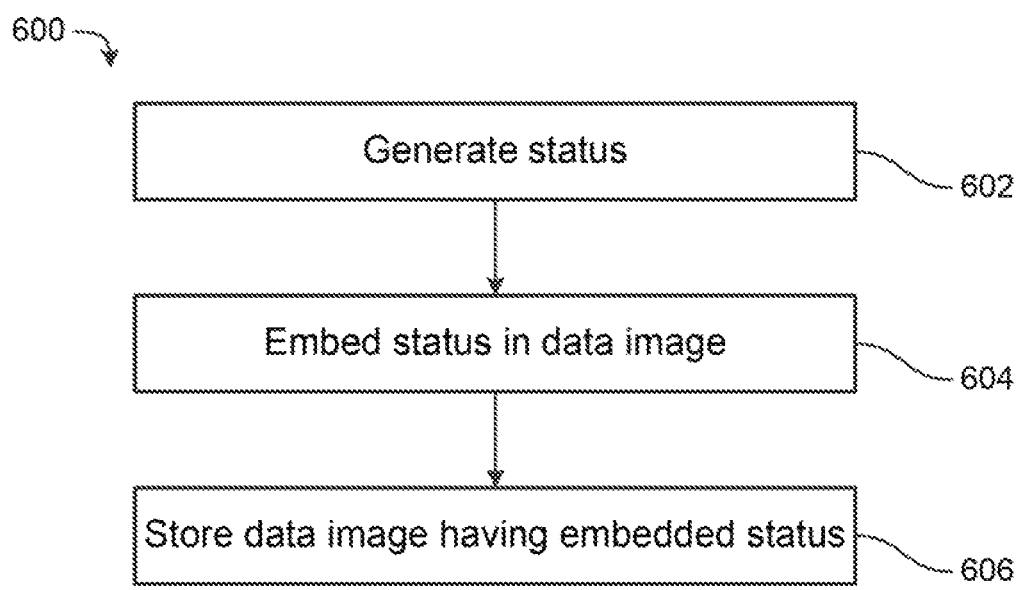
FIG. 6 is a flowchart of an example method for storing a status for a data image.
Figure 7:
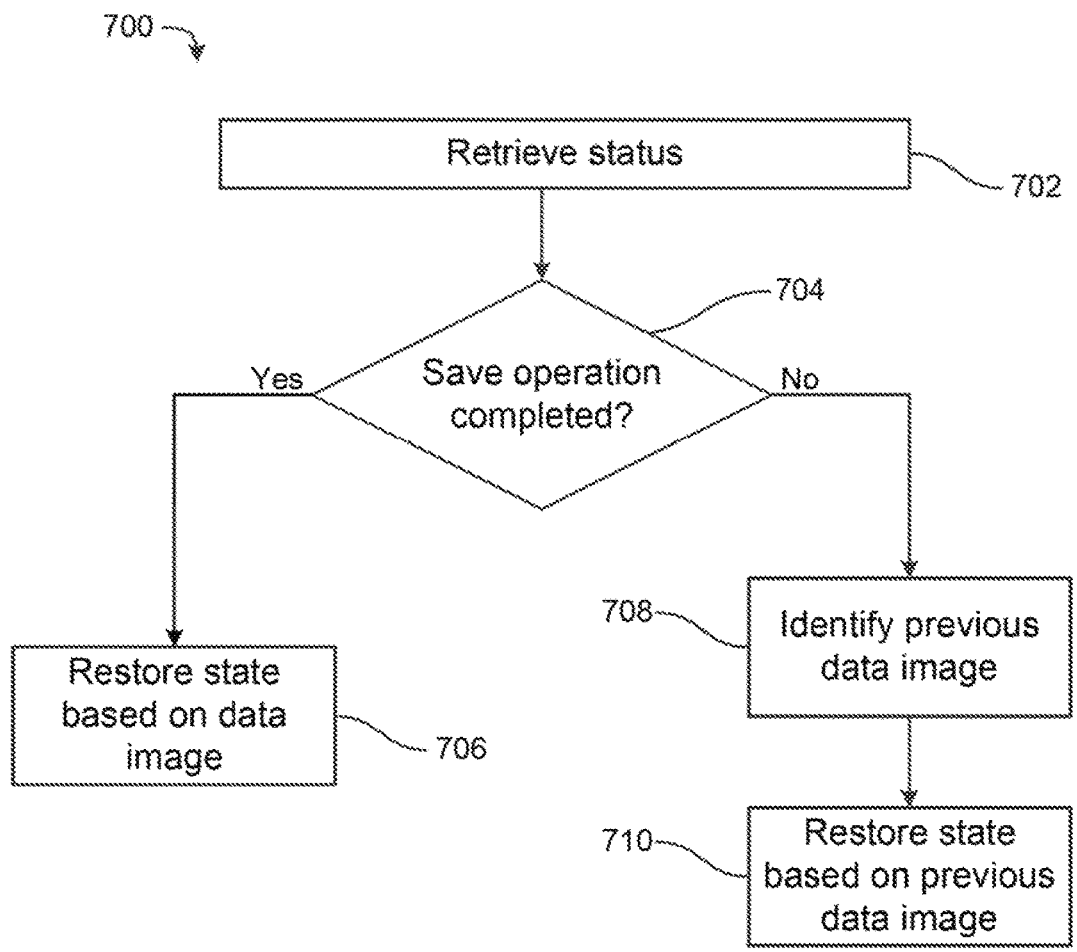
FIG. 7 is a flowchart of an example method for restoring a state of a memory module.

Methods related to generating and storing data images and respective statuses are discussed with respect to FIGS. 5-7. FIG. 5 is a flowchart of an example method 500 for generating a status for a data image. Although execution of method 500 is described below with reference to processor 402 of FIG. 4, it should be understood that execution of method 500 may be performed by other suitable devices, such as processor 302 of FIG. 3. Method 500 may be implemented in the form of executable instructions stored on a machine-readable storage medium and/or in the form of electronic circuitry.

Method 600 may start in block 502, where processor 402 may identify an event in response to which a save operation is initiated on a memory module. In some implementations, processor 402 may identify an event by monitoring buffers, power planes, and/or other components on the memory module, as discussed above with respect to FIG. 1. In some implementations, the memory module may be an NVDIMM. A data image may be generated during the save operation.

In block 504, processor 402 may generate a status for the generated data image. The status may include an event portion indicative of the identified event, and a completion portion indicative of whether the save operation was completed. In some implementations, the event portion may further be indicative of whether data in the data image is valid, as discussed above with respect to FIG. 1.

In block 506, processor 402 may store the generated status and data image in a non-volatile memory. For example, processor 402 may store a generated status and data image in NVM 108 of FIG. 1 or NVM 208 of FIG. 2. In some implementations, the status may be stored in a first region of the non-volatile memory, and the data image may be stored in a second region of the non-volatile memory. Each stored status may be stored with a pointer to the corresponding data image, or vice-versa.

FIG. 6 is a flowchart of an example method 600 for storing a status for a data image. Although execution of method 600 is described below with reference to processor 402 of FIG. 4, it should be understood that execution of method 600 may be performed by other suitable devices, such as processor 302 of FIG. 3. Some blocks of method 600 may be performed in parallel with and/or after method 500. Method 600 may be implemented in the form of executable instructions stored on a machine-readable storage medium and/or in the form of electron circuitry.

Method 600 may start in block 602, where processor 402 may generate a status for a generated data image. The status may include an event portion and a completion portion, as discussed above with respect to FIG. 5. In block 604, processor 402 may embed the status in the data image. For example, processor 402 may embed the status in a header of the data image, or among copied data in the data image.

In block 606, processor 402 may store, in a non-volatile memory, the data image having the embedded status. For example, processor 402 may store the data image in NVM 108 of FIG. 1 or NVM 208 of FIG. 2. In some implementations, a checksum may be used to ensure that the appropriate status has been embedded in a data image.

FIG. 7 is a flowchart of an example method 700 for restoring a state of a memory module. Although execution of method 700 is described below with reference to processor 402 of FIG. 4, it should be understood that execution of method 700 may be performed by other suitable devices, such as processor 302 of FIG. 3. Some blocks of method 700 may be performed in parallel with and/or after method 500 or 600. Method 700 may be implemented in the form of executable instructions stored on a machine-readable storage medium and/or in the form of electronic circuitry.

Method 700 may start in block 702, where processor 402 may retrieve a status when a memory module is rebooted. The status may be retrieved from a non-volatile memory (e.g., NVM 108 or 208) on the memory module. In some implementations, the memory module may be an NVDIMM.

In block 704, processor 402 may determine, based on the completion portion of the retrieved status, whether the save operation, in response to which the data image was generated, was completed. If, in block 704, processor 402 determines that the save operation was completed, method 700 may proceed to block 706, where processor 402 may restore, based on the data image, a state of the memory module. For example, if the memory module was rebooted after a power failure, processor 402 may repopulate a volatile memory on the memory module with data that was present in the volatile memory before the power failure.

If, in block 704, processor 402 determines that the save operation was not completed, method 700 may proceed to block 708, where processor 402 may identify a previous data image that was generated during a previous save operation that was completed. For example, a previous data image that has a status indicative of a completed save operation and an event that leads to a highly coherent data image may be identified. Method 700 may then proceed to block 710, where processor 402 may restore, based on the identified previous data image, a state of the memory module.

The foregoing disclosure describes generating and storing statuses for data images. Example Implementations described herein enable more information regarding the circumstances and characteristics of data image generation to be stored, facilitating selection of a suitable data image for system recovery.

We claim:

1. A system comprising:
a save operation initiator to initiate save operations on a memory module, wherein a respective data image is generated during each save operation;
an event identifier to identify a respective event in response to which each save operation is initiated;
a status generator to generate a respective status for each generated data image, each status comprising:
an event portion indicative of the respective event in response to which the respective save operation, during which the respective data image was generated, was initiated; and
a completion portion indicative of whether the respective save operation, during which the respective data image was generated, was completed; and
a non-volatile memory to store each respective generated status and data image; and wherein:
the non-volatile memory is a first non-volatile memory; and
generated data images are generated based on a second non-volatile memory on the memory module.

2. The system of claim 1, further comprising a verifier to verify self-consistency of each status.

3. The system of claim 1, wherein the respective status for a generated data image is embedded in the generated data image.

4. The system of claim 1, wherein the respective status for a generated data image is stored in a first region of the non-volatile memory, and the generated data image is stored in a second region of the non-volatile memory.

5. The system of claim 1, wherein generated data images are generated based on a volatile memory on the memory module.

6. The system of claim 1, wherein each event portion is further indicative of whether data in the respective data image is valid.

7. A non-transitory machine-readable storage medium encoded with instructions executable by a processor, the machine-readable storage medium comprising:
instructions to identify an event in response to which a save operation is initiated on a memory module, wherein a data image is generated during the save operation based on a first non-volatile memory on the memory module; and
instructions to generate a status for the generated data image, the status comprising:
an event portion indicative of the identified event; and
a completion portion indicative of whether the save operation was completed; and
instructions to store the generated status and data image in a second non-volatile memory.

8. The non-transitory machine-readable storage medium of claim 7, wherein the event portion is further indicative of whether data in the data image is valid.

9. A method comprising:
identifying an event in response to which a save operation is initiated on a memory module, wherein a data image is generated during the save operation based on a first non-volatile memory on the memory module;
generating a status for the generated data image, the status comprising:
an event portion indicative of the identified event; and
a completion portion indicative of whether the save operation was completed; and
storing the generated status and data image in a second non-volatile memory.

10. The method of claim 9, further comprising embedding the status in the data image.

11. The method of claim 9, further comprising:
retrieving the status when the memory module is rebooted;
determining, based on the completion portion, whether the save operation was completed;
identifying, if it is determined that the save operation was not completed, a previous data image that was generated during a previous save operation that was completed; and
restore, based on the identified previous data image, a state of the memory module.

12. The method of claim 9, wherein the event portion is further indicative of whether data in the data image is valid.

* * * * *